United States Patent [19]
Albertson

[11] Patent Number: 4,611,666
[45] Date of Patent: * Sep. 16, 1986

[54] SIDEWALK AND CURB CREVICE WEEDER

[76] Inventor: Edward Albertson, 1070 W. Ocean View Ave., Norfolk, Va. 23503

[*] Notice: The portion of the term of this patent subsequent to Oct. 15, 2002 has been disclaimed.

[21] Appl. No.: 748,625

[22] Filed: Jun. 25, 1985

Related U.S. Application Data

[63] Continuation-in-part of Ser. No. 521,845, Aug. 10, 1983, Pat. No. 4,546,831.

[51] Int. Cl.⁴ ............................ A01B 1/16; A01B 1/20
[52] U.S. Cl. ........................................ 172/13; 172/375
[58] Field of Search ................ 172/13, 371, 375, 378, 172/381; D8/7, 10, 11

[56] References Cited

U.S. PATENT DOCUMENTS

| | | | |
|---|---|---|---|
| 465,448 | 12/1891 | Bostwick | 172/375 |
| 801,978 | 10/1905 | Garner | 172/375 |
| 878,920 | 2/1908 | Williams | 172/375 |
| 884,416 | 4/1908 | Poindexter | 172/13 |
| 1,018,073 | 2/1912 | Nelson | 172/13 |
| 1,147,027 | 7/1915 | Krogstad | 172/375 |
| 1,549,042 | 8/1925 | Masters | 172/371 |
| 1,633,318 | 6/1927 | Drish | 172/13 |
| 1,699,071 | 1/1929 | Kinney | 172/13 |
| 1,876,979 | 9/1932 | Larson | 172/13 |
| 1,954,854 | 4/1934 | Vonderahe | 172/371 |
| 2,203,159 | 6/1940 | Klopfenstein | 172/375 |
| 2,563,031 | 8/1951 | Gordon | 172/13 |
| 2,899,001 | 8/1959 | Paris | 172/13 |
| 3,029,878 | 4/1962 | McCulley | 172/13 |
| 3,293,674 | 12/1966 | Sapia | 172/371 X |
| 3,847,226 | 11/1974 | Long | 172/371 |
| 3,921,725 | 11/1975 | Trutor et al. | 172/375 |
| 4,177,864 | 12/1979 | Donnini | 172/371 |
| 4,546,831 | 10/1985 | Albertson | 172/13 |

FOREIGN PATENT DOCUMENTS

| | | | |
|---|---|---|---|
| 21337 | 10/1935 | Australia | 172/375 |
| 118424 | 5/1944 | Australia | 172/371 |
| 436897 | 9/1925 | Fed. Rep. of Germany | 172/375 |
| 84236 | 9/1935 | Sweden | 172/375 |
| 11046 | of 1901 | United Kingdom | 172/375 |
| 622322 | 4/1949 | United Kingdom | 172/375 |
| 455721 | 2/1975 | U.S.S.R. | 172/371 |

OTHER PUBLICATIONS

"Green River Tools"–Cultivation–p. 8, sales brochure from Green River Tools, Brattleboro, Vermont 05301, May, 1985.

Primary Examiner—Richard T. Stouffer
Attorney, Agent, or Firm—Parkhurst & Oliff

[57] ABSTRACT

A crack and crevice weeder device for cleaning undesirable growth from cracks or crevices in expansion joints between sidewalks and streets. A V-shaped cutting head is attached to an end of a U-shaped rod and a triangular shaped scraper can be attached to a point on the U-shaped rod. The U-shaped rod is fixed to a long handle which enables an operator, while standing, to remove undesirable growth from cracks or crevices and expansion joints by pulling the weeder towards him, while simultaneously applying a downward pressure.

11 Claims, 14 Drawing Figures

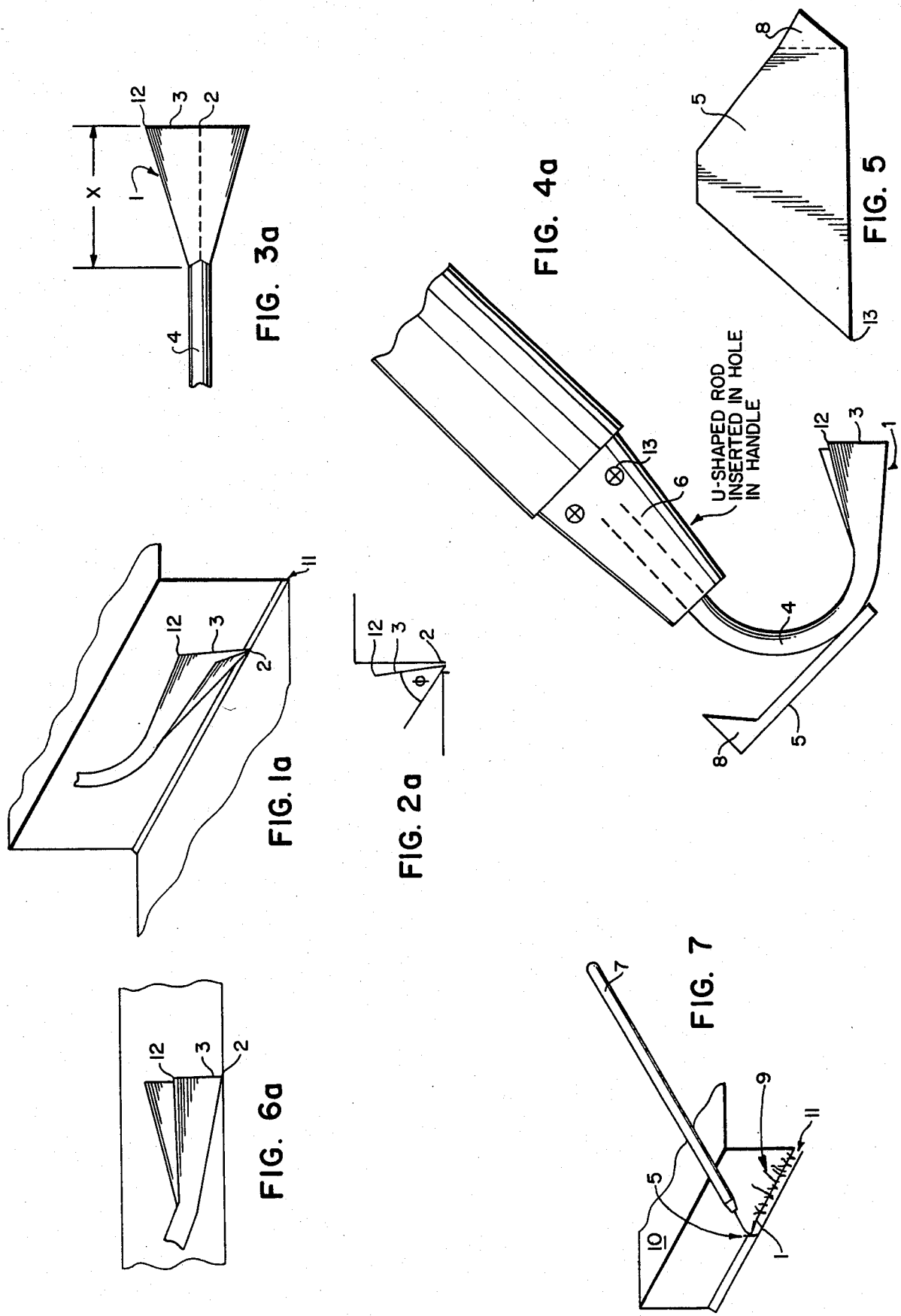

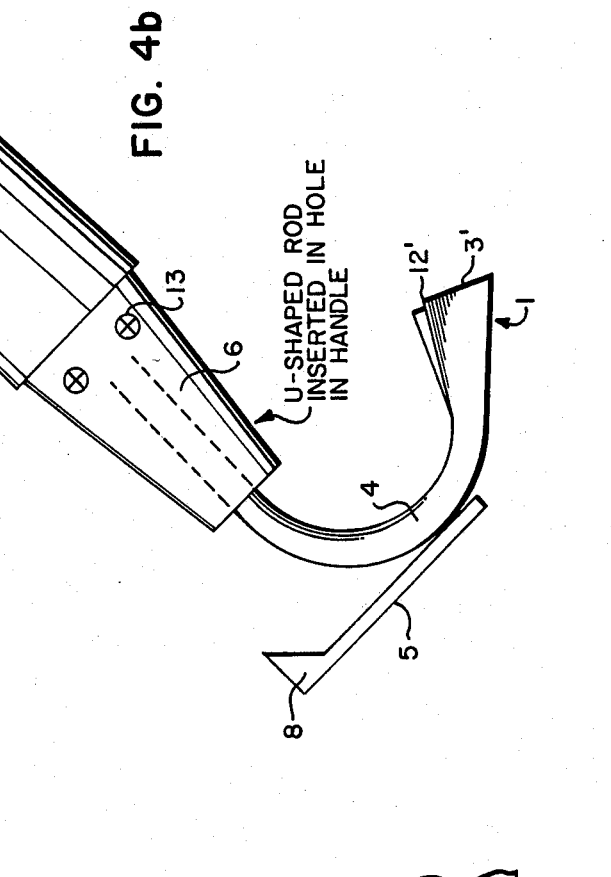
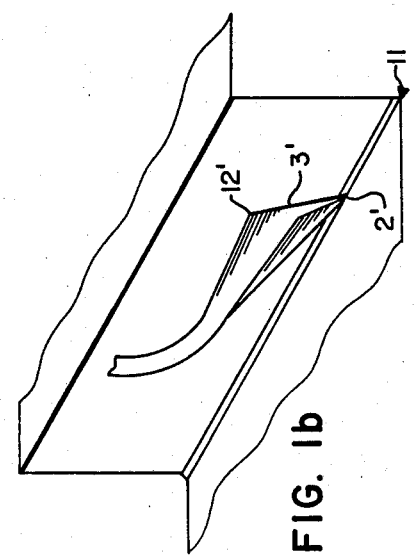
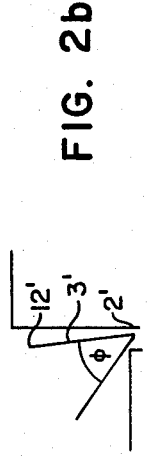
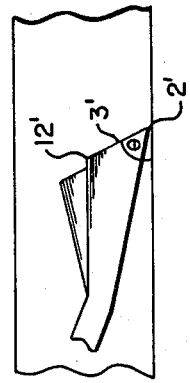

SIDEWALK AND CURB CREVICE WEEDER

BACKGROUND OF THE INVENTION

This is a continuation-in-part application of applicant's U.S. Patent Application Ser. No. 521,845 which has now matured to U.S. Letters Pat. No. 4,546,831 relating to a similar sidewalk and curb crevice weeder. Applicant has made various improvements in the invention claimed in U.S. Pat. No. 5,546,831, which were incidentally disclosed in FIG. 1 of the U.S. Pat. No. 4,546,831.

More particularly, the present invention is an improvement upon the V-shaped cutting head which is mounted on an end of U-shaped steel rod.

As was discussed in U.S. Pat. No. 4,546,831, the general idea of attempting to provide a tool for weeding purposes has been attempted, as indicated, for example, by Williams U.S. Pat. No. 878,920, Krogstad U.S. Pat. No. 1,147,027, Vonderahe U.S. Pat. No. 1,954,854, Sapia U.S. Pat. No. 3,293,674, and Long U.S. Pat. No. 3,847,226. However, none of those prior weeding devices provide the structure and efficient weeding action of device of the present invention. Additionally, none of the references cited during the prosecution of Application 521,845 disclose or suggest the present improvement upon the V-shaped cutting head. Perhaps the two most relevant patents cited were Kinney U.S. Pat. No. 1,699,071 and Paris U.S. Pat. No. 2,899,001. However, neither of these patents disclose or suggest a narrow V-shaped cutting head for protruding into narrow cracks or crevices. Still further, applicant's U.S. Letters Pat. No. 4,546,831, does not claim the V-shaped cutting head disclosed herein.

The V-shaped cutting head claimed in U.S. Letters Pat. No. 4,546,831 cannot be used effectively in sidewalk-curb interfaces because the pointed base portion of the V-shaped cutting head is located closer to the U-shaped rod than the free ends of the leg portions of the V-shaped cutting head. Accordingly, as shown in FIGS. 8(a), 8(b), the free ends of the V-shaped cutting head prohibit the pointed base portion of the V-shaped cutting head from effectively entering an interface between, for example, a sidewalk and curb interface. The V-shaped cutting head claimed in U.S. Letters Pat. No. 4,546,831 works very effectively for cracks, crevices and expansion joints in sidewalks, but does not work effectively in sidewalk-curb interfaces. Thus, this continuation-in-part application discloses an improvement upon the V-shaped cutting head which improves the performance of the weeder in sidewalk-curb interfaces.

SUMMARY OF THE INVENTION

The present invention overcomes the foregoing drawbacks. It is accordingly an object of this invention to provide a sidewalk and curb crevice weeder device having an improved V-shaped cutting head for effectively cleaning undesirable growth in an interface between a sidewalk and curb.

To obtain the above object, a sidewalk and curb crevice weeder comprises:

A V-shaped cutting head mounted on an end of a U-shaped steel rod, said V-shaped cutting head having a pointed base portion and two leg portions, each of said leg portions having first ends which are joined together to form said pointed base portion and second ends which are free ends, said second ends being substantially equidistant from the U-shaped rod with the pointed base portion, or being closer to the U-shaped rod than said pointed base portion, whereby said pointed base portion and two leg portions form a flat or convex leading edge, respectively, for protruding into narrow cracks and crevices, the pointed base portion of said V-shaped head extending toward the exterior of the U-shaped rod; and a second end of the U-shaped rod is connected to a handle by which the leading edge of the V-shaped cutting head may be drawn in and along a substantially 90° interface.

Furthermore, as disclosed in Application Ser. No. 521,845 a triangular-shaped scraper may be mounted near the bottom of the U-shaped steel rod, the scraper having at least one of its outer sharpened points forming an angle with the plane of the scraper. The U-shaped steel rod is connected to a handle of appropriate strength, length and diameter by a metal ferrule.

BRIEF DESCRIPTION OF THE DRAWINGS

The above objects, features and advantages of the present invention will become more apparent from reading the following description of the preferred embodiments taken in connection with the accompanying drawings, wherein:

FIGS. 1(a) and 1(b) are perspective views of the V-shaped cutting head of the weeder, according to the present invention;

FIGS. 2(a) and 2(b) are front views of the V-shaped cutting head of the weeder, according to the present invention;

FIGS. 3(a) and 3(b) are top views of the V-shaped cutting head of the weeder, according to the present invention;

FIGS. 4(a) and 4(b) display the end portion of the weeder showing the relative positioning of the triangular shaped scraper in relation to the V-shaped cutting head and the U-shaped rod;

FIG. 5 is a front view of the triangular-shaped scraper;

FIGS. 6(a) and 6(b) are schematic applicational views of the V-shaped cutting head;

FIG. 7 is a general perspective applicational view of the weeder, according to the present invention.

DETAILED DESCRIPTION OF THE PREFERRED EMBODIMENTS

Figure 8A:
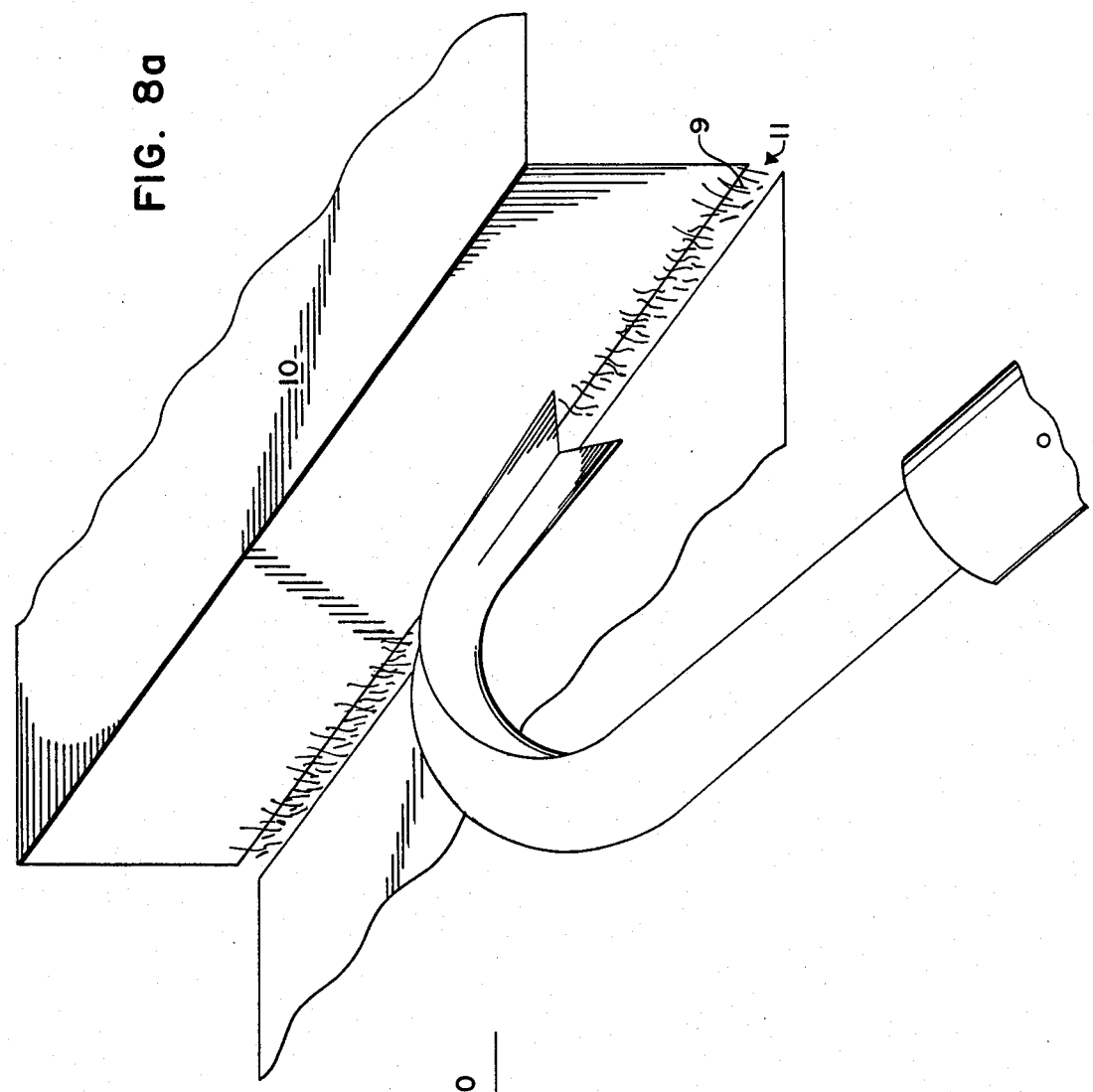
FIG. 8 shows the weeder claimed in applicant's copending Application Ser. No. 521,845 which has now matured to U.S. Letters Pat. No. 4,546,831.

The present invention is described in detail with reference to the accompanying drawings which illustrate different embodiments of the present invention.

Throughout each of FIGS. 1-7, two different embodiments of the V-shaped cutting head is disclosed. Each of the different embodiments of the V-shaped cutting head are referred to generically by the numeral "1". However, FIGS. 1(a)-6(a) represent a different embodiment from FIGS. 1(b)-6(b). More particularly, for example, free ends of the V-shaped cutting head according to the first embodiment are denoted by the reference numeral 12 in FIGS. 1(a)-6(a) whereas free ends of the V-shaped cutting head according to the second embodiment are denoted by the reference numeral "12'" in FIGS. 1(b)-6(b). This indexing scheme has been used in each of the Figures.

Figure 8B:
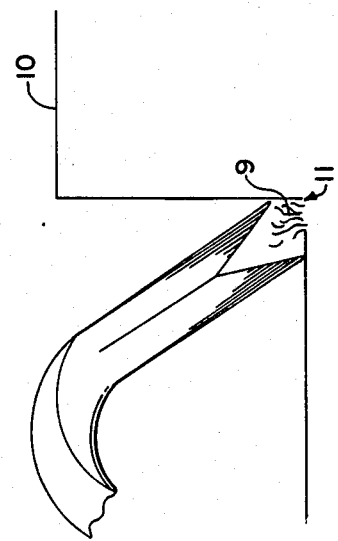

It is apparent from comparing each of the embodiments disclosed in FIGS. 1-7 with the embodiments disclosed in FIG. 8, that the V-shaped cutting head according to the invention claimed in applicant's copending Application Ser. No. 521,845 which has now matured to U.S. Letters Pat. No. 4,546,831 for removing undesirable growth from a sidewalk-curb interface, an operator may find it more desirable to utilize the V-shaped cutting head for such an operation. FIGS. 1(a)-3(a) and 1(b)-3(b), disclose the shape of the V-shaped cutting head of the crevice weeder. This V-shaped cutting head permits the cutting head 1 to enter a crevice 11 in a sidewalk-curb interface to remove undesirable growth 9 therefrom. The first embodiment of the V-shaped cutting head 1, disclosed in FIGS. 1(a)-3(a) comprises a sharp, flat leading edge, and the second embodiment disclosed in FIGS. 1(b)-3(b), comprises a sharp, convex leading edge, each edge for protruding into a crevice 11 and for grabbing or cutting the weeds and grass 9 growing therein. Each sharp leading edge according to each embodiment is formed from a pointed base portion 2, 2' and two leg portions 3, 3'. Each of the leg portions 3, 3', according to each embodiment have first ends which are joined together to form said pointed base portions 2, 2' and second ends 12, 12' which are free ends. FIG. 3(a) shows that the free ends 12 are substantially equidistant from the U-shaped rod 4 with said pointed base portion 2, according to the first embodiment, as represented by the distance "X". However, as shown in FIGS. 3(b), the free ends 12' are closer to the U-shaped rod than said pointed base portion 2', according to the second embodiment, as represented by the distance "Y". Furthermore, as shown in FIGS. 2(a) and 2(b), an angle $\phi$ is created between the free ends 12—12 and 12'—12', and $\phi$ is not more than fifty (50) degrees. Thus, when the weeder is in its use position, the sharp leading edge can be in a vertical plane, according to the first embodiment shown in FIG. 6(a), or form an acute angle $\theta$ with respect to the sharp leading edge and the horizontal plane formed by the ground or road, as shown in FIG. 6(b) and according to the second embodiment. Accordingly, in each embodiment, the pointed base portion is the outermost portion of the weeder and is the first portion to contact undesirable growth in a crack or crevice.

FIGS. 4(a) and 4(b) also disclose the relative positioning of the V-shaped cutting head 1 upon a U-shaped steel rod 4. The U-shaped bend permits the weeder operator to remain in a standing position while pulling the V-shaped cutting head 1 towards him. The U-shaped steel rod 4 is fixed to a wooden handle 7 by a metal ferrule 6 or any other suitable means. The metal ferrule 6 can be fixed to the wooden handle 7 by screws 13. The U-shaped rod is inserted into a hole in the handle 7. FIG. 4 also discloses the relative positioning of a triangular shaped scraper 5, which can be mounted on a bottom portion of the "U" on the U-shaped steel rod 4.

The triangular shaped scraper 5 is further disclosed in FIG. 5. The triangular shaped scraper 5 is attached, by welding or any other suitable means, to the U-shaped steel rod 4. One of the outward points 8 of the triangular shaped scraper can be bent in towards the U-shaped steel rod 4, whereas another pointed end 13 can remain within the plane of the scraper 5. The triangular shaped scraper 5 is utilized by rotating the wooden weeder handle approximately 180° from the V-shaped cutting head application, thereby placing the triangular shaped scraper 5 in contact with a sidewalk or road surface.

The triangular shaped scraper 5 performs two separate functions. If a crack or crevice 11 is extremely narrow, too narrow for the V-shaped cutting head 1 to fit into, either pointed end 8 or 13 of the triangular shaped scraper 5 can be used to remove undesirable growth 9 therefrom. To perform this function, the triangular shaped scraper 5 rests on the flat edge which connects the two outward points 8 and 13, and slides along the street with one of the pointed corners of the scraper in contact with the 90° crack 11 occurring between the street and curb. Again, the operator pulls the weeder in a direction towards him, while keeping the scraper in simultaneous contact with the street and curb, thereby eliminating the undesirable growth 9 from the crack 11.

FIG. 7 shows a perspective view of the various applications of the sidewalk and curb crevice weeder. To operate the weeder device, utilizing the V-shaped cutting head 1, one places the pointed base portion 2, 2' of the V-shaped cutting head 1 into a crack or crevice 11 which is desired to be cleaned. The operator, while in a standing position, pulls the handle towards him, the handle forming an angle of approximately 45° with respect to the road surface, while applying a downward pressure. This allows the tool to slide along the inside of the crack 11 resulting in undesirable growth being easily removed therefrom. However, if the crack 11 is too narrow to allow entry of the pointed base portion 2, 2', of the V-shaped cutting head 1, then the operator simply rotates the wooden handle approximately 180° and thereby places the sharply pointed end 8 or 13 of the triangular shaped scraper 5 in contact with the crack 11 and uses a similar pulling motion.

The V-shaped cutting head 1 according to the present invention is an improvement over the V-shaped cutting head claimed in applicant's co-pending Application Ser. No. 521,845, because the present V-shaped cutting head can be more effectively utilized in expansion joints between a road and sidewalk, thereby enhancing the performance of the invention.

While various proportions and alternate elements or embodiments of the present invention may occur to those skilled in the art, such alternate dimensions, elements or embodiments, when within the spirit of the present disclosure and the scope of the following claims, are considered to be part of the disclosed weeder of the present invention.

What is claimed is:

1. A weeder device for removing undesirable growth occurring in cracks, crevices and sidewalk-road interfaces, comprising:

a V-shaped cutting head at one end of a U-shaped rod, said V-shaped cutting head including a pointed base portion and two leg portions, each of said leg portions having first ends which are joined together to form said pointed base portion and second ends, which are free ends, said second ends each being substantially the same distance from the U-shaped rod as said pointed base portion, said pointed base portion and two leg portions forming a sharpened flat leading edge for protruding into narrow cracks, the pointed base portion of said V-shaped cutting head extending toward the exterior of the U-shaped rod, such that when the weeder is in its use position, the pointed base portion is the outermost point of the weeder and is the first portion to contact undesirable growth in a crack or crevice; and a second end of the U-shaped rod is connected to a handle by which the sharpened flat leading edge of the V-shaped cutting head may be drawn in and along cracks and crevices.

2. The apparatus of claim 1, wherein a hole is drilled in an end of the handle and said other end of the U-shaped rod is inserted therein.

3. The apparatus of claim 2, wherein the U-shaped rod is connected to the handle by a metal ferrule.

4. The apparatus of claim 3, wherein the metal ferrule is fixed to the handle by screws which extend into the handle.

5. The apparatus of claim 1, wherein a triangular-shaped scraper is mounted near a bottom portion of the U-shaped rod, having at least one of its outer sharpened points forming an angle with the plane of the scraper.

6. The apparatus of claim 1, wherein an angle between said leg portions is not greater than fifty degrees.

7. A weeder device for removing undesirable growth occurring in cracks, crevices and sidewalk-road interfaces, comprising:

a V-shaped cutting head at one end of a U-shaped rod, said V-shaped cutting head including a pointed base portion and two leg portions, each of said leg portions having first ends which are joined together to form said pointed base portion and second ends, which are free ends, said second ends being closer to the U-shaped rod than said pointed base portion, said pointed base portion and two leg portions forming a sharpened convex leading edge for protruding into narrow cracks, whereby an angle between said leg portions is not greater than fifty degrees, the pointed base portion of said V-shaped cutting head extending toward the exterior of the U-shaped rod, such that when the weeder is in its use position, the pointed base portion is the outermost point of the weeder and is the first portion to contact undesirable growth in a crack or crevice; and a second end of the U-shaped rod is connected to a handle by which the sharpened convex leading edge of the V-shaped cutting head may be drawn in and along cracks and crevices.

8. The apparatus of claim 7, wherein a hole is drilled in an end of the handle and said other end of the U-shaped rod is inserted therein.

9. The apparatus of claim 8, wherein the U-shaped rod is connected to the handle by a metal ferrule.

10. The apparatus of claim 9, wherein the metal ferrule is fixed to the handle by screws which extend into the handle.

11. The apparatus of claim 7, wherein a triangular-shaped scraper is mounted near a bottom portion of the U-shaped rod, having at least one of its outer sharpened points forming an angle with the plane of the scraper.

* * * * *